United States Patent [19]

Stout

[11] 3,980,886

[45] Sept. 14, 1976

[54] GAMMA CAMERA DISPLAY SYSTEM
[75] Inventor: Karl J. Stout, Hudson, Mass.
[73] Assignee: Raytheon Company, Lexington, Mass.
[22] Filed: Oct. 17, 1975
[21] Appl. No.: 623,538

Related U.S. Application Data
[63] Continuation-in-part of Ser. No. 418,157, Nov. 21, 1973, Pat. No. 3,914,611.

[52] U.S. Cl. ............................. 250/369; 250/363 S; 250/366
[51] Int. Cl.² ......................................... G01T 1/164
[58] Field of Search ................. 250/363 S, 366, 369

[56] References Cited
UNITED STATES PATENTS

| | | |
|---|---|---|
| 3,573,458 | 4/1971 | Anger ........................... 250/369 X |
| 3,732,419 | 5/1973 | Kulberg et al. .................. 250/363 S |
| 3,777,146 | 12/1973 | Brunnett et al. ................. 250/363 S |
| 3,908,128 | 9/1975 | Richey ............................ 250/366 |

Primary Examiner—Archie R. Borchelt
Attorney, Agent, or Firm—David M. Warren; Joseph D. Pannone; Milton D. Bartlett

[57] ABSTRACT

In a gamma camera having an array of photomultipliers coupled via pulse shaping circuitry and a resistor weighting circuit to a display for forming an image of a radioactive subject, the improvement being a linearizing circuit coupled to the weighting circuit, the linearizing circuit including a nonlinear feedback circuit with diode coupling to the weighting circuit for linearizing the correspondence between points of the display and points of the subject.

4 Claims, 5 Drawing Figures

| TERMINAL | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| X COMBINER | NC | 12 + | 6 + | 12 + | 12 − | 6 − | 12 − | 6 + | 4 + | 3 + | 4 + | 6 + | NC | 6 − | 4 − | 3 − | 4 − | 6 − | NC |
| Y COMBINER | NC | 12 + | NC | 12 − | 12 − | NC | 12 + | 6 + | 12 + | NC | 12 − | 6 − | 6 − | 6 − | 12 − | NC | 12 + | 6 + | 6 + |
| Z COMBINER | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − |
| E COMBINER | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − |

GAMMA CAMERA DISPLAY SYSTEM

CROSS REFERENCE TO RELATED APPLICATION

This is a continuation in part of application Ser. No. 418,157, filed Nov. 21, 1973, now U.S. Pat. No. 3,914,611.

BACKGROUND OF THE INVENTION

Cameras utilized in providing an image of a radioactive source are frequently composed of a scintillator crystal and a collimator for guiding radiant energy from the source to the scintillator crystal. An array of photomultipliers is positioned on the side of the scintillator crystal opposite the collimator for receiving flashes of light emitted by the crystal in response to the incident radiant energy. Typically, the measure of light energy received by each photomultiplier is obtained by integrating circuits coupled to each of the photomultipliers, the relative magnitude of these energies serving to indicate the location of each of the light flashes on the crystal. The stored energy of each of the integrating circuits is converted to a signal suitable for combining with the signals obtained from the other integrators. Weighting circuitry is utilized in the combining of these signals to provide points on a display, such as a cathode ray tube display, which correspond to the points of illumination upon the scintillation crystal. A circuit having an electronic window, frequently referred to as a pulse height analyzer, is utilized in the coupling of the signals from the photomultipliers to the display to insure that only signals having an energy within a prescribed range of energies are coupled to the display.

A problem arises in that the photomultiplier are often placed close to the scintillator crystal to maximize the resolution of the camera; however, the close spacing increases the nonlinear relationship between the locations of points on the display and corresponding locations of the light flashes on the scintillator crystal. Thus, for example, a sequence of light flashes of the scintillator crystal arranged in a straight line, being formed in response to a radioactive subject having the form of a straight line, may be bowed due to the geometric relationships between the individual flashes of light and the positions of individual ones of the photomultipliers. The angle of orientation of a flash of light as viewed from one of the photomultipliers varies nonlinearly with respect to displacement of the flash of light from the axis of the photomultiplier, the nonlinearity of this relationship becoming more pronounced with the closeness of the photomultiplier to the scintillator crystal. In addition, the intensity of the light flashes as received by an individual photomultiplier varies in a nonlinear fashion as a function of the position of the light flash from the axis of a photomultiplier. As a result, an observer of the display can detect nonlinearities in the displayed image of a subject viewed by the gamma camera.

SUMMARY OF THE INVENTION

The foregoing problems are overcome and other aspects of the invention are provided by a gamma camera incorporating an electronic system in accordance with the invention wherein each photomultiplier is provided with its own integrator and pulse shaping circuit for providing signals having waveforms suitable for high resolution imaging. These pulse signals are then coupled via a linearizing circuit to summing circuits wherein the pulse signals are summed together by scaling resistors of suitable values to weight the magnitudes of these signals in accordance with the positions of the corresponding photomultipliers in the array, thereby providing X and Y coordinate values of the positions of successive incidences of gamma ray photons. The signals of the pulse shaping circuits are further combined to provide a measure of the total energy of the incident gamma ray photons, each of these measures being applied to a pulse height analyzer circuit which is utilized for operating a sampling circuit to sample only such ones of the X and Y coordinate signals as result from gamma photons of suitable energy. In addition, in accordance with the invention, the signals of the photomultipliers are coupled via the linearizing circuit in a feedback arrangement in a summing circuit which provides a measure of the total energy of the incident radiation, this summation being compared to a reference signal by a difference amplifier which includes a nonlinear feedback circuit incorporating a diode. The output signal of the difference amplifier is fed back by a diode circuit to be combined with the signals from the individual photomultipliers whereby perturbations of the photomultiplier signals introduced by the nonlinearities caused by the proximity of the photomultipliers to the scintillation crystal are removed. This introduces a linear relationship to the electrical signals representing the locations of the flashes of light and thereby improves the linearity of the displayed image.

BRIEF DESCRIPTION OF THE DRAWINGS

The aforementioned features and other advantages of the invention are explained in the following description taken in connection with the accompanying drawings wherein.

DESCRIPTION OF THE PREFERRED EMBODIMENT

Figure 1:
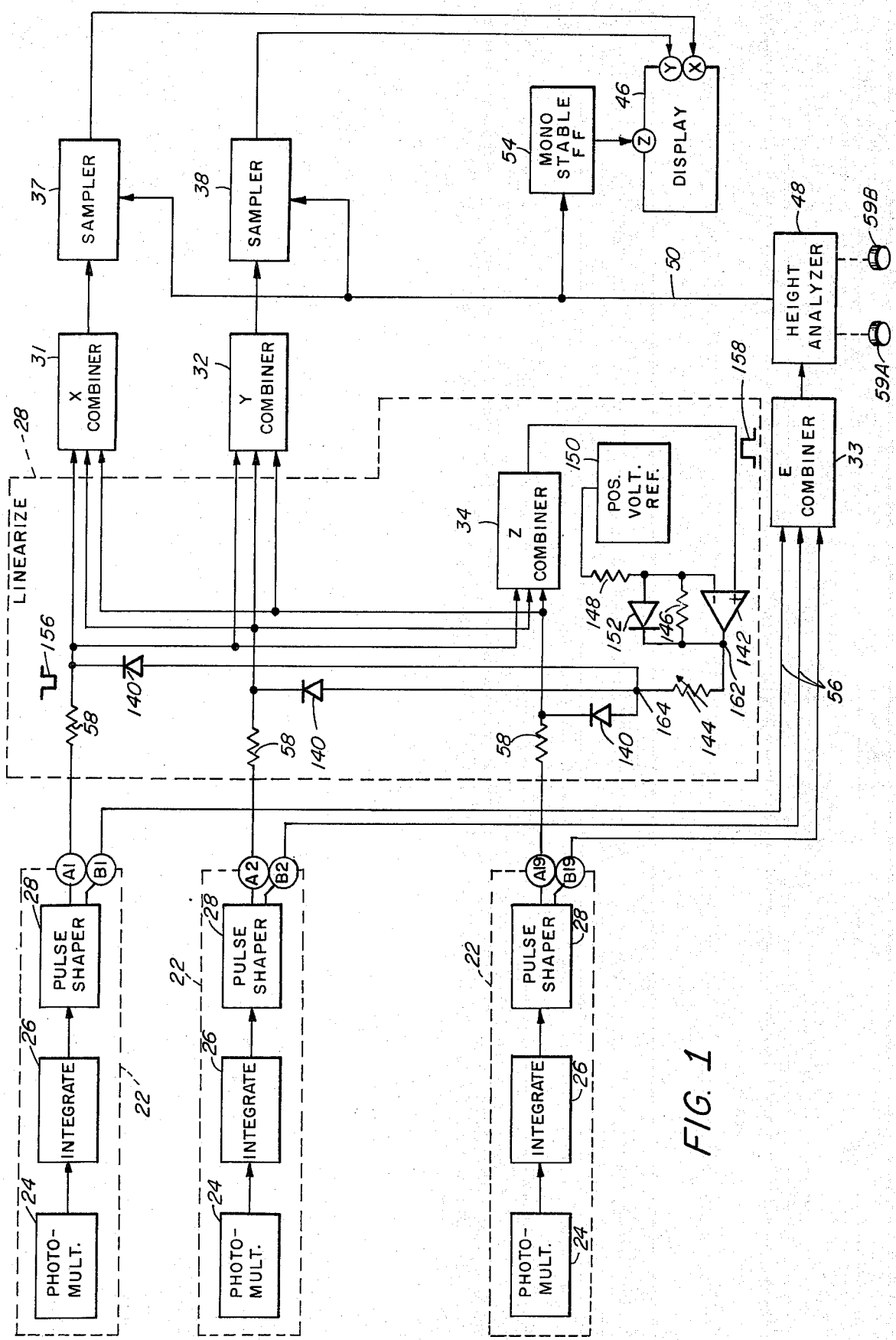
FIG. 1 is a block diagram of the camera system in accordance with the invention.

Referring now to FIG. 1, there is shown a block diagram of the electrical portion of a camera system 20 which comprises a plurality of channels 22, each channel 22 comprising a photomultiplier 24, an integrator 26 and a pulse shaper 28. Each of the channels 22 is coupled via its output terminal A and a linearizing circuit 28 to three combiners 31, 32 and 33, and to a fourth combiner 34 contained within the linearizing circuit 28. The combiners 31 and 32 are coupled respectively to samplers 37 and 38 which, in turn, are coupled to the X and the Y terminals of a display 46. The output of the combiner 33 is coupled to an analyzer 48 which analyzes the pulse height of signals from the combiner 33, the output of the analyzer 48 being applied along line 50 to trigger the samplers 37 and 38 and a monostable flip-flop 54. The flip-flop 54 provides a gate signal to the Z axis terminal of the display 46 for illuminating the display 46 with signals having the X and Y coordinate positions provided by the samplers 37 and 38. The linearizing circuit 28, as will be described hereinafter, provides for a varying of the strengths of the signals from terminal A in each of the channels 22, in accordance with the invention, to provide a set of signals to the input terminals of the X and Y combiners 31 and 32 further produce increased linearity between the points of a subject viewed by the system 20 and the points of an image of that subject as displayed on the display 46.

In operation, the electrical portion of the camera system 20 provides for an image on the display 46 related to the signals provided by the photomultipliers 24 in each of the channels 22 in the following manner. In each channel 22, the photomultiplier 24 provides a series of pulse signals corresponding to individual flashes of light incident upon the photomultiplier 24, a series of these flashes of light being produced in response to a single gamma ray photon or x-ray photon impinging upon a scintillator crystal, to be described hereinafter with reference to FIG. 2, which is placed in front of the photomultipliers 24. The series of the light flashes represent the energy transferred from the gamma ray photon to the scintillator crystal and, accordingly, the signals provided by the photomultiplier 24 in response to each of the light flashes are summed together by means of the integrator 26 to provide a measure of the energy of a gamma ray photon or x-ray photon impinging upon the scintillator crystal.

The pulse shaper 28 receives a signal voltage from the integrator 26 and converts it into a pulse having a duration very much shorter than the integration time of the integrator 26, and having an amplitude proportional to the peak voltage of the signal voltage of the integrator 26. The waveforms of the pulses of the pulse shapers 28 in each of the channels 22 are suitable for being arithmetically combined for providing information with respect to the position of an impact of a gamma ray photon upon the scintillator crystal.

Each of the pulse shapers 28 is coupled directly by a line 56 to the combiner 33 and by a resistor 58 of the linearizing circuit 28 to the combiners 31, 32, and 34. The combiners 31-34, as will be seen in FIG. 4, are provided with scaling resistors for scaling the contributions of the pulse shapers 28 in accordance with the geometry of the photomultipliers 24, as will be seen in FIG. 2, to provide signals representing the X component and the Y component of the location of an impact of a gamma ray photon upon the scintillator crystal, the combiner 31 providing the X component and the combiner 32 providing the Y component. The combiner 34 provides an approximate measure of the total energy received by all of the photomultipliers 24 which is used in the feedback arrangement for linearizing the signals as will be described hereinafter, the approximation being due to the diodes 125 of FIG. 3 which have a small forward voltage drop.

The image on the display 46 is further enhanced by means of the combiner 33 and the analyzer 48, the combiner 33 functioning in a manner similar to that of the combiner 34 to provide a measure of the total energy received by the photomultipliers 24. The analyzer 48 is a well known pulse height analyzer which provides the forementioned signal on line 50 in response to signals from the combiner 33 when the combiner 33 indicates that the energy of an impinging gamma ray photon is in excess of a preset minimum energy level and less than a preset maximum energy level, these energy levels being set by the knobs 59A and 59B. The samplers 37 and 38 are triggered in response to the signal on line 50 and provide a sample of the voltages appearing at the outputs of the combiners 31 and 32.

Figure 2:
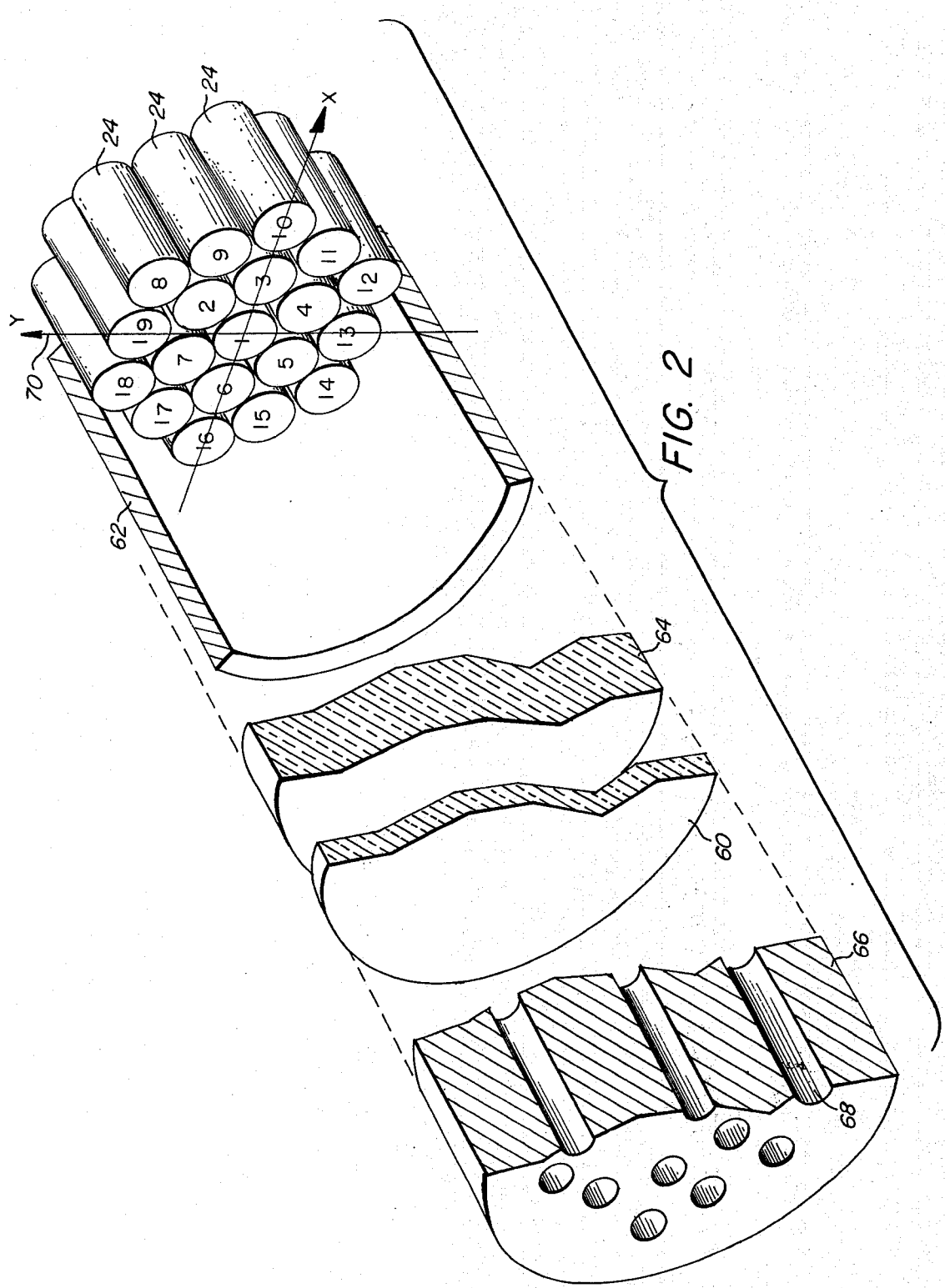
FIG. 2 is an exploded view of an assembly of the photomultipliers referred to in FIG. 1 showing the position of the photomultipliers in relation to a scintillator crystal and a collimator.

Referring now to FIG. 2, there is shown an array of the photomultipliers 24 with individual ones of the photomultipliers 24 being numbered to identify their location in the array. The central photomultiplier 24 is numbered 1, the photomultipliers of the inner hexagon are numbered 2 through 7, and the photomultipliers of the outer hexagon are numbered 8 through 19. Also shown in FIG. 2 is a scintillator 60 in the form of a crystal of a material which emits light in response to excitation by high energy radiation, such a material being, for example, sodium iodide with thallium doping. The scintillator 60 is supported in relation to the photomultipliers 24 by means of a housing 62 and is spaced from the front faces of the photomultipliers 24 by means of a light pipe 64 which is fabricated preferably of a material such as Lucite having a refractive index of approximately 1.5 to match the optical impedance of the scintillator 60 to the front faces of the photomultipliers 24. A collimator 66 having parallel passages 68 for conducting high energy photons to the scintillator 60 is positioned in front of the scintillator 60 by means of a housing 62 and oriented in the direction of a subject (not shown) to be imaged, the subject being a source of high energy radiation. High energy photons emitted from the source in the direction of the axis of the collimator 66 pass through the passages 68 to illuminate the scintillator 60 in a pattern corresponding to the form of the subject. Photons incident upon the collimator 66 in a nonaxial direction are substantially absorbed in the material, preferably lead, from which the collimator 66 is fabricated.

A reference frame 70 having an X coordinate axis and a Y coordinate axis may be positioned anywhere upon the array of photomultipliers 24 but is conveniently centered upon the array of photomultipliers 24 such that the Y axis passes through the photomultipliers numbered 19, 1 and 13 while the X axis passes through the photomultipliers numbered 10, 3, 1, 6 and 16. With respect to the X axis combiner 31 of FIG. 1, the signals derived from the photomultipliers 24 are suitably scaled or weighted in accordance with their respective distances from the Y axis. Similarly, with respect to the Y coordinate combiner 32 of FIG. 1, the signals derived from the photomultipliers 24 are suitably scaled or weighted in accordance with their respective distances from the X axis. These weightings will be described subsequently with reference to the table in FIG. 5. While various spacings between the scintillator 60 and the array of photomultipliers 24 may be utilized, it has been found that a spacing in the range of approximately 1/2 radius to 1 radius of a photomultiplier 24 is most advantageous for providing a sharp image on the display 46 of FIG. 1.

Figure 3:
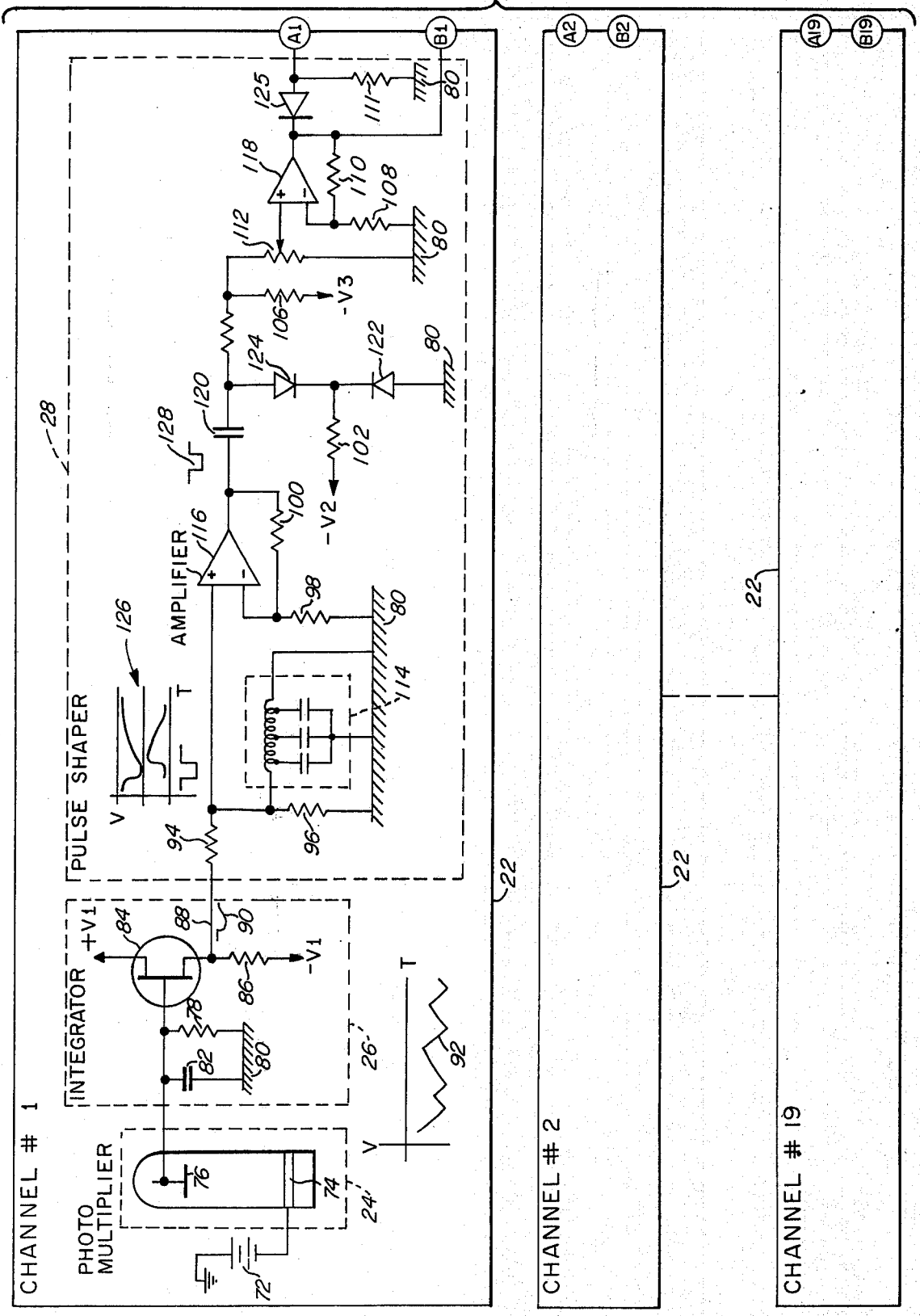
FIG. 3 is a schematic diagram of the electrical circuitry utilized in an integrator and a pulse shaper referred to in FIG. 1.
Figures 4, 5:
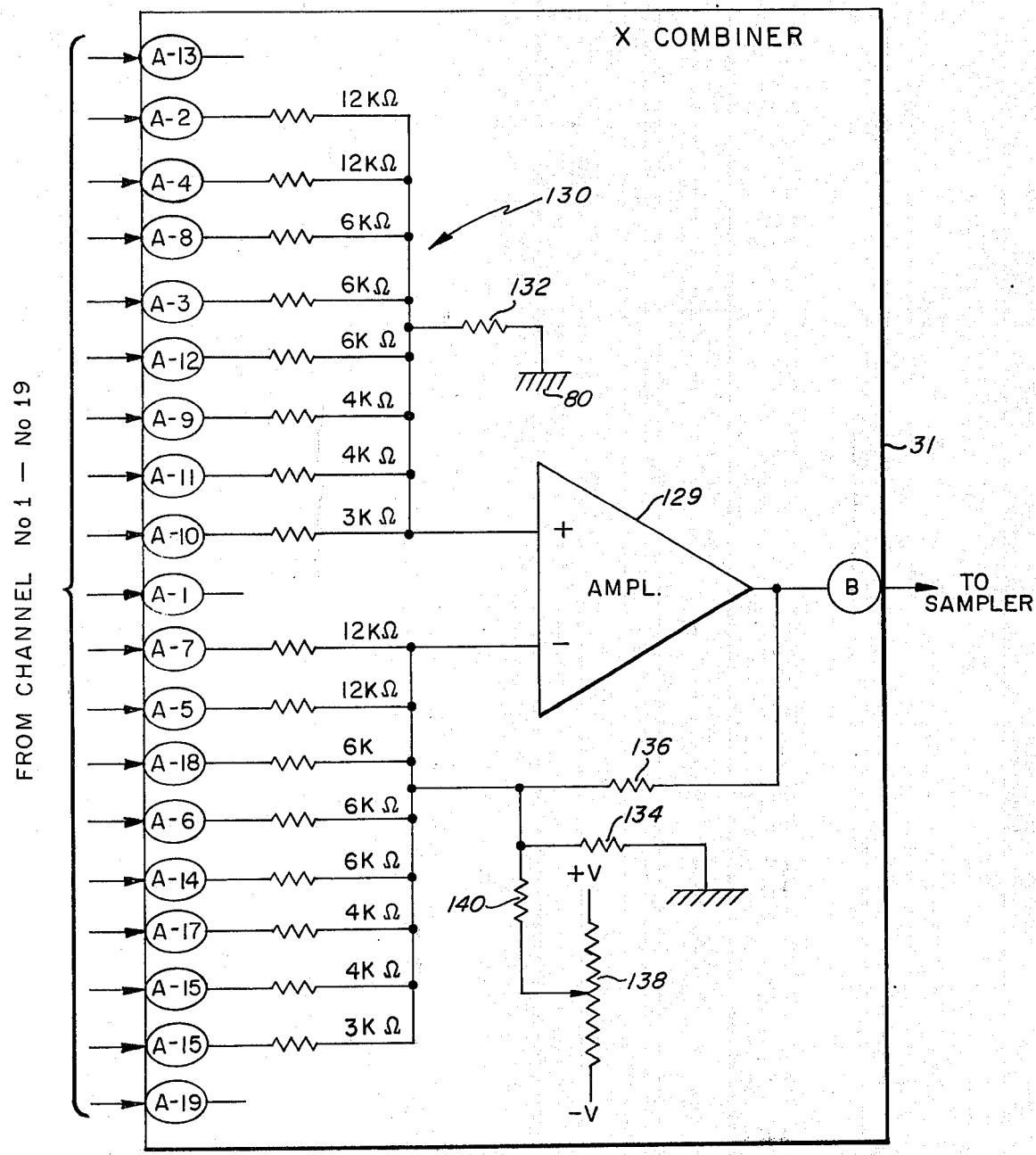
FIGS. 4 and 5 show, respectively, a circuit for combining the pulse signals and a table of resistor values for scaling the signals for the combiner circuit of FIG. 1.

Referring now to FIG. 3, there is shown a schematic diagram of the circuitry in one of the channels 22 of FIG. 1, it being understood that the circuitry is the same in each of the channels 22. There are 19 of the channels corresponding to each of the 19 photomultipliers 24 of FIG. 2. Each channel 22 is seen to have output terminals identified with the letters A and B, these terminals being further identified by the numerals 1-19 when it is desired to designate the terminal of a specific one of the channels 22. Each photomultiplier 24 is energized by a source of electrical power shown as a battery 72 and has its photoelectric electrode 74 being connected to the negative terminal of the battery 72 while the anode 76 of the photomultiplier 24 is connected via a resistor 78 and ground 80 to the positive terminal of the battery 72. A capacitor 82 is connected in parallel with the resistor 78.

The capacitor 82 serves as the integrating element in the integrator 26 with the resistor 78 providing a discharge path for charge stored within the capacitor 82. It is noted that by grounding the positive terminal of the battery 72 and coupling the integrating capacitor 82 and the resistor 78 between the anode 76 and ground 80, there is provided a substantial reduction in any noise voltage which might appear across the terminals of the capacitor 82. Due to the fact that the output impedance of the photomultiplier 24 is relatively high while the input impedance of the pulse shaper 28 is relatively low, a field effect transistor (FET) 84 with its gate terminal coupled to the resistor 78 and its drain terminal coupled to the pulse shaper 28 serves as an amplifier for matching the impedance of the integrator 26 to that of the pulse shaper 28. The transistor 84 is coupled between a positive source of voltage V1 and a negative source of voltage having a value V1 by a resistor 86 coupled to its drain terminal. A typical voltage waveform appearing across the terminal of the capacitor 82 as well as across the output resistor 86 is shown adjacent the line 88 at the output of the integrator 26 and identified by the symbol 90. The waveform 90 represents a portion of a more extended waveform shown in graph 92 wherein the vertical axis labeled V represents the voltage while the horizontal axis labeled T represents time. It is seen that the voltage builds up repetitively at a rate depending on the rate of light flashes produced by the scintillator 60 of FIG. 2 and, between successive rises of the voltage, is seen to discharge exponentially with a time constant given by the product of the capacitance of the capacitor 82 and the resistane of the resistor 78. In particular, it is noted that the shape of the waveform varies with a dependence on the interval between successive impacts of gamma ray photons upon the scintillator 60 of FIG. 2.

The pulse shaper 28 is seen to comprise resistors 94, 96, 98, 100, 102, 104, 106, 108, 110 and potentiometer 112, a delay line 114 shown as a multiply tapped inductor with capacitors connected between the taps and ground, differential amplifiers 116 and 118, a capacitor 120 and diodes 122 and 124. The signal on line 88 is coupled via resistor 94 to the positive input terminal of the difference amplifier 116. The resistor 94 also couples the signal from line 88 to the delay line 114. The value of the resistor 94 and the value of the resistor 96 are such that the parallel combination of resistance of the resistors 94 and 96 is equal to the impedance of the delay line 114. The right hand terminal of the delay line 114 is grounded at ground 80 with the result that a pulse signal traveling down the delay line 114 is reflected and inverted from the grounded terminal from which it then propagates back towards the resistor 96. Thereupon there is no further reflection because of the matched impedance provided by the combination of the resistors 94 and 96. Thus, at the positive input terminal of the amplifier 116 there appears the summation of the signal at line 88 with an inverted replica thereof appearing across the resistor 96. The signals are portrayed in graph 126 wherein the upper waveform has the same shape as the waveform 90, the middle waveform has the same shape as the waveform 90 but is delayed by a delay equal to the round trip transit time of the delay line 114, and the lower waveform is equal to the summation of the upper and middle waveforms. The time delay of the delay line 114 is selected to introduce into the lower waveform of the graph 126 a pulse width which is much narrower than the discharge time of the capacitor 82 in the integrator 26. The lower waveform of the graph 126 is shown also at the output of the amplifier 116 where the waveform is identified by the numeral 128. The resistor 98 is coupled between the negative input terminal of the amplifier 116 and ground 80 while the resistor 100 serves as a feedback resistor, being coupled between the output terminal of the amplifier 116 and its negative input terminal, for insuring that the shape of the pulse waveform 128 is an accurate copy of the lower waveform of the graph 126.

The pulse shaper 28 includes a base line restoration circuit or adjusting the waveform of the signal of the amplifier 116 to insure that successive pulses provided by the amplifier 116 have amplitudes independent of the amplitudes of preceding ones of the pulses. The base line restoration is accomplished by a capacitively coupling, via capacitor 120, the output of the amplifier 116 through the resistor 104 and the potentiometer 112 to the amplifier 118. The diode circuit comprising the diode 122 and 124 is coupled to the junction of the capacitor 120 with the resistor 104, the terminals of the diodes 122 and 124 being coupled together via the resistor 102 to a source of negative voltage of value V2. The diodes 122 and 124 serve to discharge the capacitor 120. During the application of a negative voltage to the capacitor 120 by the amplifier 116, the diode 124 is open; however, any charge accumulated during this application of negative voltage is removed upon the occurrence of the trailing edge of the pulse waveform 128 at which time the diode 124 conducts. The junction of the diodes 122 and 124 with the resistor 102 is maintained at a constant value of potential by a virtue of a current flowing from the ground 80 through the diode 122 and the resistor 102 towards the source of negative voltage V2.

Amplitude discrimination is provided by the diode 125 in cooperation with the resistor 111. Pulses from the amplifier 118 of relatively small amplitude wherein the amplitude is less than the forward voltage drop of the diode 125 appear at terminal B but do not appear at terminal A. However, pulses from the amplifier 118 having a voltage amplitude greater than the forward voltage drop of the diode 125 causes the diode 125 to conduct whereupon the voltage is seen at terminal A. Thus, the signals, appearing at terminal A have been selected to be only those signals exceeding a threshold, this being the aforementioned forward voltage drop across the diode 125.

While a battery 72 of fixed voltage is shown, it is advantageous to use a variable voltage source in which the voltage is adjusted to provide a predetermined value of signal in the output of the E combiner 33 when the photomultipliers 24 are activated in response to a specific isotope. This provides a normalization of the system 20 for specific isotopes so that the amplitudes of the pulse waveform 128 fall within approximately the same range of values for various isotopes.

Referring now to FIGS. 4 and 5, there are shown respectively a schematic diagram of the combiner 31 of FIG. 1 and a table showing the values of the summing resistors which serve to scale or weight the signals from the channels 22, the table having four rows corresponding respectively to the resistor values of the X combiner 31, the Y combiner 32, the Z combines 34, and the E combiner 33 of FIG. 1. The circuitry configurations for each of the four combiners 31–34 are identical; accordingly, only the circuit of the combiner 31 is shown in the figures with the specific terminal interconnections of the individual circuits of the four combiners 31–34 being seen in the table of values of FIG. 5.

The combiner 31 is seen to comprise an amplifier 129, summing resistors 130, and resistor 132 coupling the plus terminal of the amplifier 129 to ground 80, a resistor 134 coupling the minus terminal of the amplifier 129 to ground, a feedback resistor 136 coupling the output terminal of the amplifier 129 to its minus input terminal for setting the gain of the amplifier 129, and a potentiometer 138 coupled between a positive and negative source of voltage and coupled to the minus terminal of the amplifier 129 by a resistor 140 for providing an adjustable voltage offset. While there are 19 terminals, A1–A19, only sixteen summing resistors 130 are provided for the combiner 31, there being no connection to the terminals A1, A13, and A19, this being indicated by the letters NC in the first row of FIG. 5. The reason for the lack of connection to the terminals A1, A13 and A19 is apparent from the arrangement of the photomultipliers 24 in FIG. 2 wherein it is seen that the correspondingly numbered photomultipliers 24 are located on the Y axis of the reference frame 70 and, accordingly, get a 0 weighting with respect to determining position in the direction of the X axis.

Referring to the second row of the table in FIG. 5, it is noticed that in the X axis combiner 32, there is no connection provided by the signals of five of the photomultipliers 24 and their correspondingly numbered terminals, these being the terminals 1, 3, 6, 10 and 16, the lack of connection being shown in the second row of the table of FIG. 5, the lack of connection being due to the fact that, as shown in FIG. 2 these five photomultipliers are located on the X axis of the reference frame 70 and, therefore, make no contribution to displacements in the direction of the Y axis.

The values of the summing resistors 130 are in inverse relationship to the distances of the corresponding photomultipliers 24 from a coordinate axis of the reference frame 70 of FIG. 2. Thus, for example, the photomultipliers 24 numbered 2, 4, 5 and 7 are given a value of 12 kilohms in the X combiner 31 since their centers are spaced a half diameter from the Y axis. The photomultipliers 24 numbered 8, 3, 12, 14, 6 and 18 have corresponding resistance values of 6 kilohms in the X combiner 31 since these photomultipliers have their centers spaced one diameter from the Y axis. The photomultipliers 24 numbered 9, 11, 15 and 17 are provided with resistors having values of 4 kilohms in the X combiner 31 since these photomultipliers have their centers spaced one and one-half diameters from the Y axis. And, finally, the photomultipliers 10 and 16 have their corresponding resistors being valued at 3 kilohms in the X combiner 31 since these photomultipliers 24 have their centers spaced at a distance of 2 diameters from the Y axis. Similar comments apply to the resistors of the Y combiner 32 as shown in the second row of the table in FIG. 5 since the photomultipliers 24 numbered 17, 7, 2, 9, 11, 4, 5 and 15 are spaced at one-half the distance from the X axis of the photomultipliers 18, 19, 8, 12, 13 and 14.

With respect to the combiner 31 of FIG. 4, all of the summing resistors 130 corresponding to photomultipliers 24 of FIG. 2 which are located to the right of the Y axis are coupled to the plus input terminal of the amplifier 129 while the summing resistors corresponding to photomultipliers 24 located to the left of the Y axis are coupled to the minus input terminal of the amplifier 129. This is indicated in the first row of the table of FIG. 5 wherein plus signs are positioned beneath the resistance values for the resistors coupled at the terminals 2–4 and 8–12 while minus signs are positioned beneath the resistance values for the resistors coupled to the terminals 5–7 and 14–18. Similarly, in the second row of the table of FIG. 5, plus and minus signs are positioned beneath the resistance values to indicate that the corresponding resistors are coupled to either the plus or minus input terminals of the amplifier 129. With respect to the Z combiner 34 and and the E combiner 33, all of these summing resistors 130 are coupled to the minus input terminal of the amplifier 129, the plus input terminal being grounded via the resistor 132. Variable summing resistors may be utilized for the Z and E combiners 34 and 33, if desired, for precise adjustment of the weightings accorded the signals from the various photomultipliers 24 to minimize the effects of barrel distortion and nonlinearities in the scintillator 60 to provide a more uniform image on the display 46 of FIG. 1. Also, the potentiometer 112 of FIG. 3 may be utilized in each channel 22 for adjusting its gain to eliminate nonlinearities such as barrel distortion from the image on the display 46.

Returning now to FIG. 1, the linearizing circuit 28 further comprises diodes 140 coupled to each of the resistors 58, a difference amplifier 142 having resistors 144, 146 and 148 coupled thereto, a source 150 of voltage providing a positive voltage reference coupled by the resistor 148 to the minus input terminal of the difference amplifier 142, and a diode 152 coupled from the output of the amplifier 142 to the minus input terminal thereof.

In accordance with the invention, the linearizing circuit 28 operates in the following way to linearize the aforementioned relationship between the points of an image displayed by the display 46 and the corresponding points of a subject viewed by the scintillator 60 and the photomultipliers 24 of FIG. 2. The combiner 34 is responsive to the signal voltages provided by terminal A in each of the channels 22, the waveform of one such signal voltage being shown as waveform 156, and provides an output signal having the waveform 158. The operation of the Z combiner 34 has been previously explained with reference to FIGS. 4 and 5. The voltage source 150 sums via the resistor 148 a positive voltage to the minus input terminal of the amplifier 142 while the signal having waveform 158 is applied to the positive input terminal of the amplifier 142. Thereby, the output terminal of the amplifier 142 at point 162 provides a voltage related to the difference between the voltage of the signal waveform 160 and the voltage of the source 150.

In accordance with the invention, the diode 152 clamps the voltage between the point 162 and the minus input terminal of the amplifier 142, there being a current flowing from the point 162 through the diode 152 and the resistor 148 to the source 150. Since the diode 152 is in the feedback path of the amplifier 142, there is minimal gain for negative voltage signals applied to the plus input terminal of the amplifier 142.

The resistor 146 has much greater resistance than the resistor 148 to provide a large value of gain to the amplifier for positive voltage signals applied to the plus input terminal of the amplifier 142. The positive voltage appearing at point 162 in response to the signal waveform 158 is summed via the resistor 144 to the voltage at the junction 164 of the diodes 140. In this way, a signal related to the totality of the signals from terminal A in each of the channels 22 is combined with such ones of the individual signals from the channels 22 as have magnitudes which render the diodes 140 conducting. It is noted that the signal waveform 158 is positive with the result that a relatively small signal at a terminal A of a channel 22 is unaffected while a relatively large signal at a terminal A is diminished at their respective input terminals of the combiner 34. For example, a large signal from terminal A1 coupled via resistor 58 to its corresponding terminal of the combiner 34 is effectively pulled down by the diode 140 towards the voltage at point 162. However, in the event that the voltage at terminal A1 were equal to or less negative than the voltage at point 162, then there would be no alteration of its magnitude because the diode 140 coupling terminal A1 to point 162 would be back biased and in a state of nonconduction.

For maximum linearity, it has been found advantageous to vary the resistance of the resistor 144, the resistor 144 being shown as a variable resistor in the figure, to compensate for the positions and spacings of the photomultipliers 24 relative to the scintillator 60 of FIG. 2. By varying the value of the resistance of the resistor 144 relative to the resistance of the resistors 58, the linearizing capability of the linearizing circuits 28 can be adjusted to more accurately compensate for the variations in intensity of a light flash received by the photomultipliers 24 due to the location of the light flash within the scintillator 60 relative to the position of the photomultiplier 24 which views the light flash.

It is understood that the above described embodiment of the invention is illustrative only and that modifications thereof will occur to those skilled in the art. Accordingly, it is desired that this invention is not to be limited to the embodiment disclosed herein but it is to be limited only as defined by the appended claims.

What is claimed is:

1. In a camera system, the combination comprising:
   an array of detectors positioned in a predetermined pattern for detecting radiant energy emanating from points defining a subject, each of said detectors providing a signal upon being illuminated with such energy;
   means for combining signals of said detectors, said combining means including means for weighting signals of said detectors in accordance with the positions of individual ones of said detectors in said array to provide the coordinate positions of points in an image of said subject; and
   means coupled between individual ones of said detectors and said combining means for linearizing the correspondence between points of said image and points of said subject, said linearizing means including means for coupling individual ones of said detector signals with a feedback signal, and a nonlinear summing circuit for summing said detector signals to produce said feedback signal.

2. A combination according to claim 1 wherein said coupling of said linearizing means is accomplished by a set of diodes, individual ones of said diodes coupling individual ones of said detector signals to said feedback signal.

3. A combination according to claim 1 wherein said nonlinear summing circuit includes an amplifier having a diode circuit.

4. A system according to claim 3 wherein said diode circuit is coupled in a feedback arrangement to said amplifier.

* * * * *